July 20, 1937. R. C. MERCER 2,087,289
FILM PATCH
Filed Dec. 22, 1934
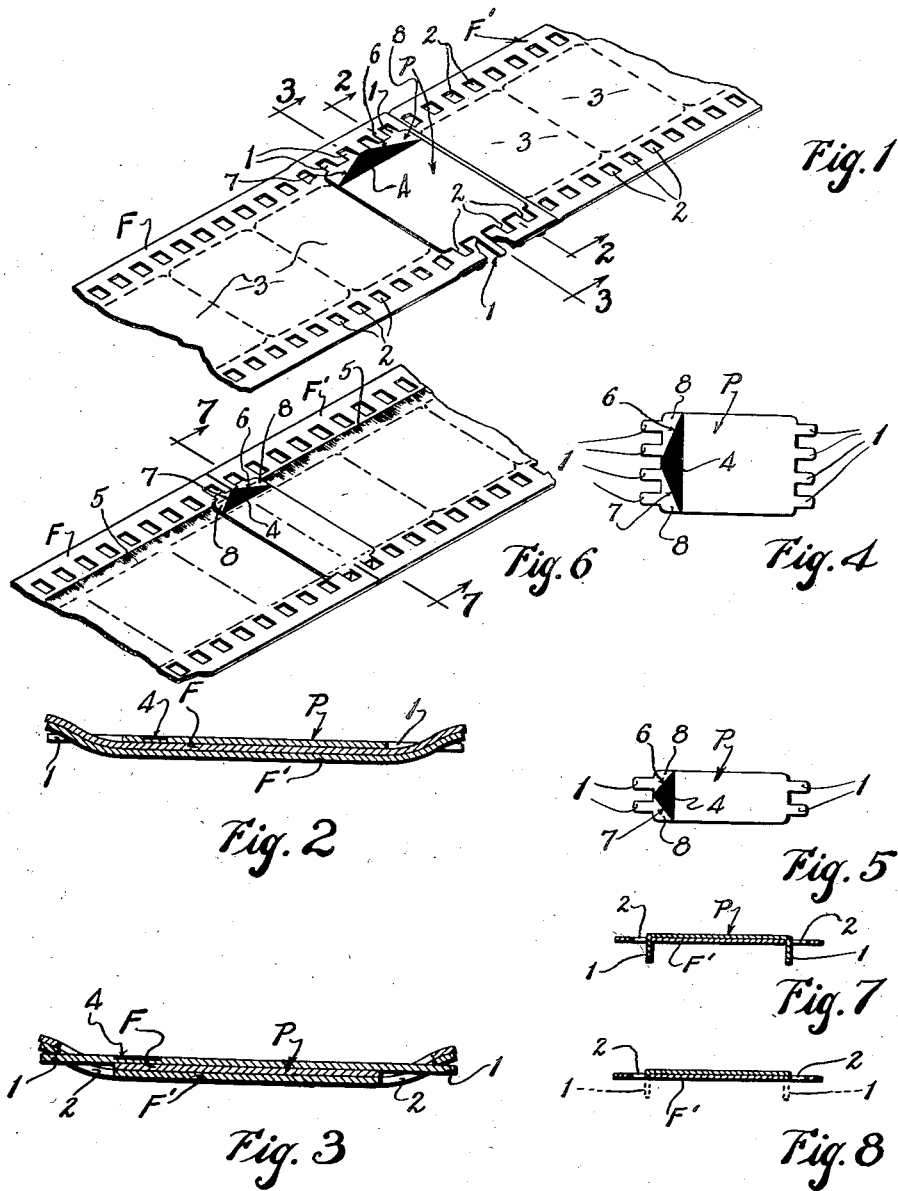
INVENTOR.
Raymond C. Mercer.
BY
ATTORNEY.

Patented July 20, 1937

2,087,289

UNITED STATES PATENT OFFICE 2,087,289

FILM PATCH

Raymond C. Mercer, Los Angeles, Calif.

Application December 22, 1934, Serial No. 758,718

3 Claims. (Cl. 88—16.2)

This invention relates to film patches of the same general form as shown in Letters Patent of the United States No. 1,389,523, granted to me on August 30, 1921, and the principal object of the present invention is to provide a simpler and more economical form of film patch than the form shown in said Letters Patent.

In the consideration of this invention it may be understood that in the repair of motion picture films after a break therein, or when operatively connecting two adjacent sections of film, the ends of the sections of film are slightly overlapped, at least to the extent of one "frame", and a thin metal patch has been heretofore used which has prongs or teeth at its sides engageable with the sprocket perforations at the margins of the films. I have found that the provision of metal patches entails unnecessary expense and the metal patches must be used over and over again in order to justify their cost.

It is an object of this invention, therefore, to provide a patch of the character mentioned which may be made of thin but tough paper, cardboard, fibre, composition or even of thin celluloid, but particularly of a non-metallic material, so that the cost of the patches will be reduced to a point which will justify their discard after but a single use.

I have discovered that in patching motion pictures having sound records thereon similar patches may be used but in a slightly different form and manner and without impairing the continuity of the sound record to an audible extent. To this end I contemplate providing the non-metallic patch of the same form as is used for silent picture films but preferably formed of wholly or partially transparent material such as celluloid or chemically treated paper or cardboard.

The sound track is usually formed at one side of the picture area of the films adjacent the perforations and if overlaid by an opaque patch of any material, when the subject matter of the film is projected as in an exhibition, what is known in the art as a "bloop" would be produced, which effect is occasioned by the movement of an obscured or broken portion of the sound record by a source of light.

Therefore, in order to prevent such an effect and to render the projection of the picture and the sound reproduction as smooth and unbroken as possible I provide an opaque area on the patch which has relatively angular margins overlying the sound record so that as the film is moved by a source of light the patched portion of the sound track will be gradually obscured by one of the inclined margins and thereafter gradually exposed by the other margin of the patch.

A patch embodying my said improvements may be formed so as to fulfill all of the requirements of silent and "talking" picture reproduction, as will be clearly explained in the description hereinafter following.

Other and more detailed objects of invention may appear as the description progresses.

I have shown a preferred embodiment of my invention in the accompanying drawing, in which:

Fig. 1 is a perspective view of a form of my improved film patch applied to and for securing together the overlapped portions of two sections of motion picture film;

Fig. 2 is a transverse section of the same on line 2—2 of Fig. 1;

Fig. 3 is a transverse section of the same on line 3—3 of Fig. 1;

Fig. 4 is a top plan view of a form of patch having a width of approximately one "frame" of a motion picture film;

Fig. 5 is a top plan view of a form of patch of approximately one-half the width of the form shown in Fig. 4;

Fig. 6 is a fragmentary perspective view of two sections of film with pictured areas and a sound record thereon and my improved patch adhesively applied thereto so as to permit the projection of the pictures and reproduction of the sound;

Figs. 7 and 8 are transverse sections of Fig. 6 on line 7—7, showing the initial and final arrangement of the patch on the film sections.

As shown in Figs. 4 and 5 my improved patch P is formed of a single piece of paper, cardboard, fibre board or other thin non-metallic material which is tough, strong and yet flexible, wholly or partially transparent or translucent of generally rectangular form with parallel sides and a plurality of prongs or teeth 1, 1, etc. uniformly spaced apart and extended longitudinally from the ends of the body, and having at least a portion thereof overlying the sound record opaque.

The patch is applied to the overlapped portions of two sections of silent motion picture film F and F' as shown in Fig. 1, with the body of the patch resting closely upon the flat surface of the uppermost film section and the prongs or teeth 1, 1, etc. extended through the sprocket perforations 2, 2, etc. It will be understood, of course, that the films F and F' are highly flexible and the patches are sufficiently flexible that the marginal portions of the films and the teeth 1 of the patches will both yield to a certain extent when the patches are positioned on the films in order that the patched film may be as nearly flat as possible.

In Figs. 2 and 3, I have shown cross sectional views of the film sections and patch applied thereto in substantially exaggerated form with the teeth of the patch disposed substantially in the plane of the body of the patch and the margins of the film sections bent, but, as stated, in actual usage, the teeth 1 will bend slightly in one direction while the margins of the films will bend slightly in an opposite direction so as to compensate for the thickness of the films and the patch.

In applying the patches to the films, the bodies of the patches are arched slightly and sufficiently to engage the teeth with the perforations 2 of the films and are then pressed downwardly against the adjacent surfaces of the films so that the patched films will readily move over the reels of a camera or projecting machine.

Motion picture films are subdivided into "frames" which constitute the uniformly spaced exposed or exposable areas of the films and the width of a patch P may be, as shown in Fig. 1, of the width of a single frame of the film, or if desired, as shown in Fig. 5, of but one-half, more or less, the width of a frame, depending upon operating conditions and requirements.

It will be quite apparent that when the patches are formed of thin but tough paper or cardboard, the teeth 1 will suffice to hold the two sections of film together, the cost of the patches will be at a minimum and far less than patches made of metal, and used patches may be discarded, whereas metal patches, due to their excessive cost, are used over and over again.

Where conditions of operation prevail which require stronger patches, the patches may be made of celluloid and the cost thereof will not be materially increased over the cost of the paper or cardboard patches.

As shown in Figs. 6, 7, and 8, the patches P are applied to abutting ends of the two film sections and are suitably opaqued at 4 at least in the areas which overlie the sound record track 5 of the film sections. Preferably the opaque portions 4 are of triangular form with the inclined margins 6 and 7 disposed over the adjacent portions of the sound track of the two film sections, the remainder of the patches being transparent or at least translucent so that light may be transmitted therethrough.

It is unimportant that the picture areas of the films which underlie the patches should be visible through the patches as the omission of one or more of said pictures in a series will not materially impair the projected picture, but it is important that the triangular end portions 8, 8 outwardly of the opaque areas 4 be transparent so that light will be readily transmitted therethrough to the sound track of the films.

Thus, as the film is moved through a projecting machine the parting line between the patched sound track sections will be obscured and the adjacent portions of the sound track will be gradually obscured by one margin of the portion 4 and gradually exposed by the other margin thereof, thereby preventing a sudden break in the continuity of the sound reproduction and a momentary noise or "bloop" as the light is discontinued and then continued by the movement of the patch relative to a source of light.

When used in connection with sound record films my patch is permanently applied to the reverse or untreated sides of said film sections, as shown in Figs. 6, 7, and 8. Preferably, glue or a suitable cement is applied to the adjacent portions of the films or to the reverse side of a patch and the teeth 1 are bent inwardly at right angles to the body of the patch. The patch is then laid flatwise upon the film sections with the teeth extended through corresponding perforations 2 of the film sections and when it is determined that the patch is completely attached to the film sections the extended ends of the teeth 1 may be clipped off, and the patched film may then be run through a projecting machine without interference or interruption.

Thus, it will be understood that my improved patch is of composite character and of dual utility in that the same patch may be utilized, as shown, for temporarily patching films having no sound track and for permanently patching films having a sound track thereon.

What I claim, is:

1. The method of patching motion picture sound record films which consists in disposing two sections of film with their ends abutted, affixing a patch over the joint therebetween by threading portions of the patch through the film perforations, cementing said patch to said film, and over adjacent portions of said film and opaquing a portion of said patch overlying said sound record whereby successive portions of said sound record will be obscured and exposed gradually during the projection of the subject matter of said film, then removing certain parts of those portions of the patch which are threaded through said perforations.

2. A combined film splicing and sound track modifying element for simultaneously joining the two end portions of a sound film together and reducing objectionable sound effects at the splice comprising a body portion adapted to lie between the side marginal edges of the film and having projections adapted to engage in the perforations at each side of the film sections, said body portion being provided with a variable light transmitting portion adapted to overlie the sound track with its densest portion substantially at the transverse line of the splice.

3. A combined film splicing and sound track modifying element for simultaneously joining the two end portions of a sound film together and reducing objectionable sound effects at the splice comprising a flexible non-metallic body portion adapted to lie between the side marginal edges of the film and having a plurality of laterally extending projections at each side edge adapted to engage in the perforations at each side of the film sections to hold said end portion in alignment, said body portion being provided with a variable light transmitting portion adapted to overlie the sound track on said film sections with its densest portion substantially at the transverse line of the splice.

RAYMOND C. MERCER.